United States Patent
Velankar et al.

(10) Patent No.: US 12,043,278 B2
(45) Date of Patent: Jul. 23, 2024

(54) SYSTEMS AND METHODS FOR DETERMINING DRIVABLE SPACE

(71) Applicant: Rivian IP Holdings, LLC, Plymouth, MI (US)

(72) Inventors: Akshay Arvind Velankar, San Jose, CA (US); Vikram Appia, San Jose, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 377 days.

(21) Appl. No.: 17/384,510

(22) Filed: Jul. 23, 2021

(65) Prior Publication Data
US 2023/0032669 A1    Feb. 2, 2023

(51) Int. Cl.
*B60W 60/00*    (2020.01)
*G06N 3/08*    (2023.01)
*G06T 7/70*    (2017.01)

(52) U.S. Cl.
CPC ............ *B60W 60/001* (2020.02); *G06N 3/08* (2013.01); *G06T 7/70* (2017.01); *B60W 2420/403* (2013.01); *B60W 2552/20* (2020.02); *B60W 2554/4049* (2020.02); *G06T 2210/12* (2013.01)

(58) Field of Classification Search
CPC .......... B60W 60/001; B60W 2420/42; B60W 2552/20; B60W 2554/4049; G06N 3/08; G06T 7/70; G06T 2210/12; G06T 2207/20081; G06T 2207/20084; G06T 2207/30261; G06T 7/74
See application file for complete search history.

(56) References Cited

U.S. PATENT DOCUMENTS

| | | | |
|---|---|---|---|
| 10,937,178 B1* | 3/2021 | Srinivasan | G06T 7/521 |
| 11,688,161 B2* | 6/2023 | Mousavian | G06V 10/255 |
| | | | 382/103 |
| 2020/0218979 A1* | 7/2020 | Kwon | G06F 18/2155 |
| 2021/0209797 A1* | 7/2021 | Lee | G06T 17/00 |

OTHER PUBLICATIONS

Patra, S., et al., "A Joint 3D-2D based Method for Free Space Detection on Roads," IEEE Winter Conference on Applications of Computer Vision (WACV), 2018, pp. 643-652.
Yao, J., et al., "Estimating Drivable Collision-Free Space from Monocular Video," IEEE Winter Conference on Applications of Computer Vision, 2015, pp. 420-427.

* cited by examiner

*Primary Examiner* — Anne Marie Antonucci
*Assistant Examiner* — Lidia Kwiatkowska
(74) *Attorney, Agent, or Firm* — Haley Guiliano LLP

(57) ABSTRACT

Systems and methods for determining the drivable space of a road, for applications such as autonomous navigation. To determine the non-drivable space under another vehicle, systems and methods of embodiments of the disclosure generate 3D bounding boxes from 2D bounding boxes of objects in captured roadway images, and from various geometric constraints. Image portions may be labeled as drivable or non-drivable according to projections of these 3D bounding boxes onto their road surfaces. These labeled images, along with accompanying semantic information, may be compiled to form training datasets for a machine learning model such as a CNN. The training datasets may train the CNN to classify input image portions into drivable and non-drivable space, for applications such as autonomous navigation.

19 Claims, 9 Drawing Sheets

SYSTEMS AND METHODS FOR DETERMINING DRIVABLE SPACE

INTRODUCTION

The present disclosure is directed generally to autonomous navigation. More specifically, the present disclosure is directed to determining drivable space for autonomous navigation.

SUMMARY

Autonomous navigation often relies on road surface detection methods to estimate road surfaces for purposes of vehicle path determination. Some current road surface detection approaches train machine learning models such as convolutional neural networks (CNNs) to predict road surfaces from input sensor data. Such approaches have their limitations, however. For example, some road surface detection models can detect road surfaces, but cannot determine whether these surfaces are actually drivable.

Accordingly, systems and methods are disclosed herein that determine drivable space, for applications such as autonomous navigation. In particular, to determine the non-drivable space under another vehicle, systems and methods of the disclosure generate three-dimensional (3D) bounding boxes from two-dimensional (2D) bounding boxes of objects in captured roadway images, and from various geometric constraints. Non-drivable space determined from projections of these 3D bounding boxes, along with accompanying semantic information, may form training datasets for machine learning models that can be trained to classify input image portions as being drivable or non-drivable, to assist applications such as autonomous navigation.

In some embodiments of the disclosure, a 2D image is captured, such as by a camera of an autonomous vehicle. The image may contain therewithin a number of objects such as other vehicles. A 2D bounding box may be determined for any one or more of the objects in the image. A corresponding 3D bounding box may then be generated for each 2D bounding box, to at least partially surround the corresponding object as well as to produce an estimate of the footprint occupied by that object. The 3D bounding box may be determined by positioning vertices of the 3D bounding box on edges of the 2D bounding box as an initial estimate, and subsequently optimizing vertex positions based on various other geometric constraints. The drivable space of the road may then be identified at least in part from these 3D bounding boxes. More specifically, projections of the 3D bounding boxes onto the road surface may indicate space underneath an object such as a vehicle, which may be deemed as not drivable.

Geometric constraints may be any suitable constraints selected to allow for solution of a 3D bounding box from an image of an object and its corresponding 2D bounding box. For example, an orientation of the object may be determined or estimated, such as by one or more machine learning models configured and trained to output an object pose or orientation in an input image. As another example, certain characteristic dimensions of the object may be determined by selection or estimation. For instance, the object may be classified such as by one of many machine learning-based classification schemes, and characteristic dimensions may be selected for particular classes of objects. As a specific example, an image object may be classified according to its vehicle type (e.g., truck, sedan, minivan, etc.), and a characteristic dimension such as its width may be selected or estimated according to its class.

In some embodiments of the disclosure, application of these geometric constraints may result in a set of equations for each 3D bounding box vertex point, which may be solved in any suitable manner. As one example, this set of equations may be treated as an optimization problem, and solved by employing any suitable optimization scheme, e.g., a trusted constraint region optimization scheme that seeks to iteratively revise vertex positions until a set of 3D bounding box coordinates is converged upon.

In some embodiments of the disclosure, images may contain truncated objects, e.g., objects that are only partially captured in the image. Determination of a bounding box for such truncated objects may be accomplished in any suitable manner. In one example, a 2D bounding box surrounding part of the truncated object may be successively increased in size until its corresponding 3D bounding box encompasses all semantic points or information of the object. In this manner, a 3D bounding box may be estimated for an object even though the entirety of the object does not appear in the input image.

As above, drivable space determinations may be made via use of machine learning models. More specifically, one or more machine learning models such as CNNs may be trained to take as inputs road images containing objects, and may output probabilities of each image portion being drivable or non-drivable space.

Training datasets for such machine learning models may be assembled by capturing a number of images of roads and objects, and determining 3D bounding boxes at least partially surrounding the objects. The 3D bounding boxes can be generated from corresponding 2D bounding boxes. Projections of the 3D bounding boxes onto the road surface may indicate non-drivable space, with these image portions labeled accordingly. The labeled images and accompanying semantic information may thus form a training dataset for training machine learning models to determine drivable and non-drivable space in an input image.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for determining the drivable space of a road, for applications such as autonomous navigation. To determine the non-drivable space under another vehicle, systems and methods of embodiments of the disclosure generate 3D bounding boxes from 2D bounding boxes of objects in captured roadway images, and from various geometric constraints. Image portions may be assigned labels, e.g., drivable or non-drivable, according to projections of these 3D bounding boxes onto their road surfaces. These labeled images, along with accompanying semantic information, may be compiled to form training datasets for a machine learning model such as a convolutional neural network (CNN). The training datasets may train the CNN to classify input image portions into drivable and non-drivable space, for applications such as autonomous navigation.

Figure 1:
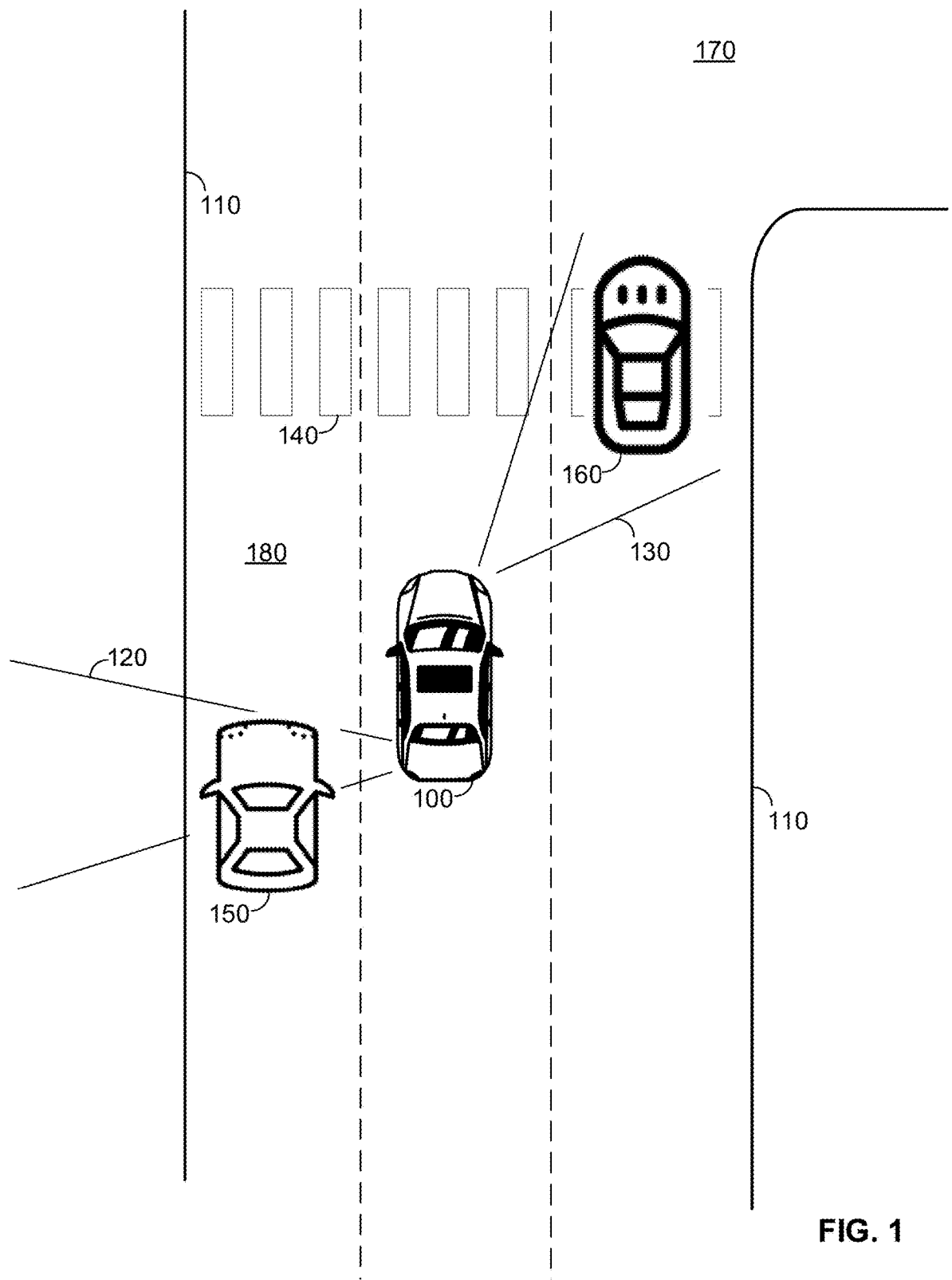
FIG. 1 is a top view of a road and vehicles thereon, conceptually illustrating operation of systems and methods for drivable space determination in accordance with embodiments of the disclosure.

FIG. 1 is a top view of a road and vehicles thereon, conceptually illustrating operation of systems and methods for drivable space determination in accordance with embodiments of the disclosure. Here, vehicle 100 may be a vehicle that employs a number of onboard sensors to assist in navigation, such as a smart vehicle or a vehicle capable of assisted or autonomous navigation. Vehicle 100 may thus employ its sensors to detect objects within detectable range. For example, vehicle 100 may employ cameras to detect objects within fields of view 120 and 130, such as a curbside 110 and other vehicles 150, 160 as shown. Onboard cameras or other sensors may also capture other features that potentially affect navigation, such as crosswalk 140.

In operation, vehicle 100 may use sensors such as visible light cameras to capture images of fields of view 120, 130, within which are vehicles 150, 160. From these images, vehicle 100 draws 2D bounding boxes around the images of vehicles 150, 160, then calculates corresponding 3D bounding boxes surrounding or substantially surrounding the vehicles 150, 160. The footprints of these 3D bounding boxes, or the projections of 3D bounding boxes onto their underlying roads or other surfaces, describe non-drivable spaces that vehicle 100 should account for in navigation. That is, vehicle 100 cannot drive into the footprints of either vehicle 150, 160. Vehicle 100 thus uses its calculated non-drivable spaces in navigation. In the example shown, vehicle 100 may calculate a route that does not cross into the right lane, to avoid the non-drivable space presented by vehicle 160. Similarly, if vehicle 100 intends to turn right at the intersection 170 shown, it may slow down or otherwise wait until vehicle 160 has passed the intersection 170, before entering the right lane. Likewise, if vehicle 100 intends to enter the left lane 180, it may speed up to pass the non-drivable space presented by vehicle 150 before entering the left lane 180.

Figure 2A:
FIGS. 2A-2B are images of vehicles conceptually illustrating 2D and 3D bounding box formulation in accordance with embodiments of the disclosure.
Figure 2B:
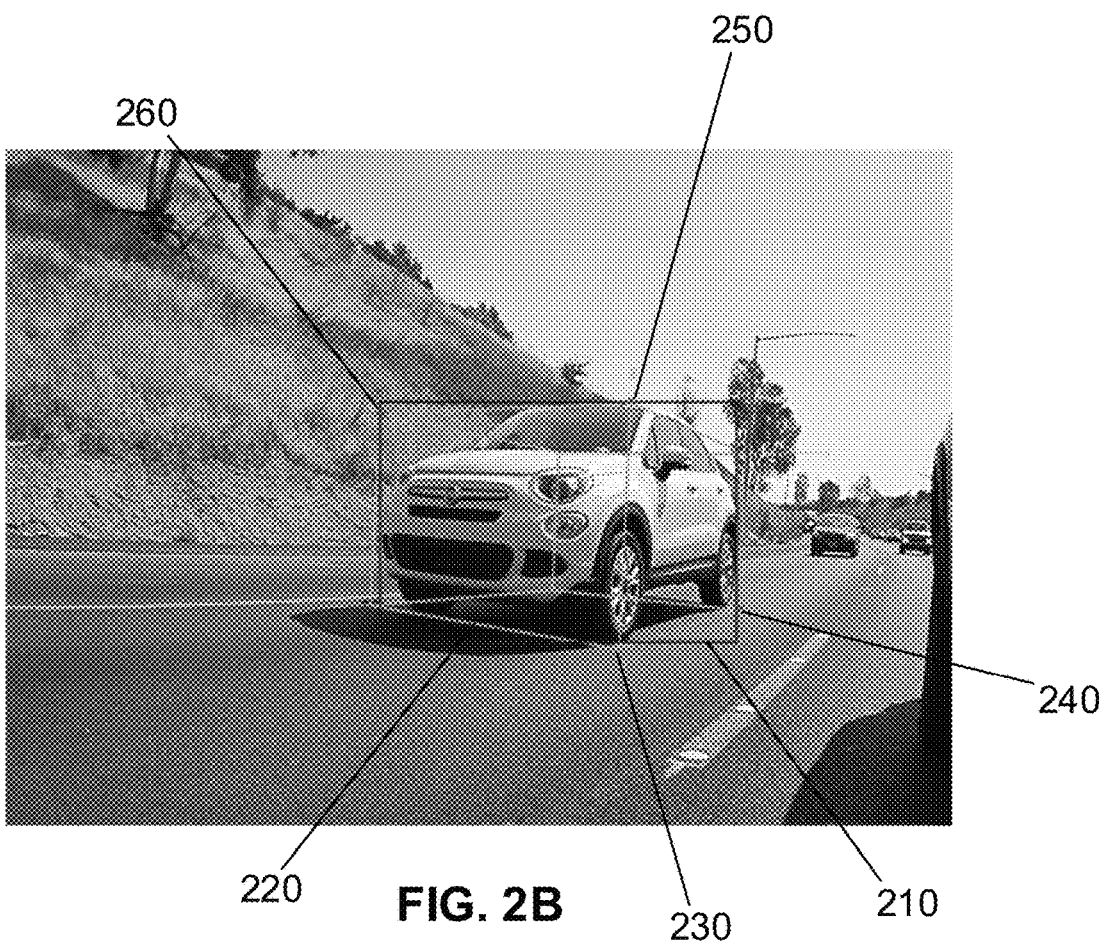

FIGS. 2A-2B are images of vehicles conceptually illustrating 2D and 3D bounding box formulation in accordance with embodiments of the disclosure. As in FIG. 2A, a 2D bounding box 210 is first calculated for an object 200 captured in an image. Calculation of 2D bounding box 210 may be performed in any manner, such as by known computer vision-based methods and processes for identifying an object and fitting a box to its outer edges. For example, objects and their outer boundaries may be identified and located within an image using any methods such as edge detection methods, feature searching methods, probabilistic object models, graph matching, histograms of oriented gradients (HOGs) fed into classifiers such as support vector machines, HaarCascade classifiers, and the like. Any suitable methods are contemplated. In some embodiments, 2D bounding boxes may be fitted to identified objects in any manner, such as by drawing a rectangular box whose edges are both oriented parallel to the axes of the camera coordinate system, and are each tangent to an outer edge of the identified object. In some embodiments, 2D bounding boxes may be fitted to identified objects by drawing a rectangular box whose vertical edges are oriented parallel to an axis of the vehicle whose orientation is determined by an orientation sensor of the vehicle.

As shown in FIG. 2B, a 3D bounding box 220 is calculated from 2D bounding box 210. Embodiments of the disclosure contemplate determination of 3D bounding boxes 220 from 2D bounding boxes 210 in any suitable manner. In some embodiments, a set of geometric constraints may be imposed to reduce the number of variables involved. A solution may then be found for the reduced set of variables. The geometric constraints may be any solution (3D bounding box coordinates) constraints whose imposition results in a sufficiently accurate bounding box. As one example, 3D box 220 width may be set by selecting a width value from a predetermined table of different categories of vehicles. That is, vehicle 200 may first be classified as belonging to a particular vehicle type, e.g., sedan, truck, sports utility vehicle (SUV), bus, or the like. Classification may be carried out in any manner. In some embodiments, vehicle 200 classification may be carried out by one or more machine learning models, such as a CNN trained to receive input images of vehicles, and output likelihoods that these vehicles correspond to particular vehicle categories. Such CNNs may be trained on training data sets containing images of vehicles labeled with their particular vehicle types, as will be discussed in detail below with reference to FIG. 6.

Once a vehicle 200 is classified as being of a particular type, its estimated or actual width may be determined. Width determination may be carried out in any suitable manner. In some embodiments, width values may be retrieved from a table of approximate widths for each vehicle type. That is, systems of embodiments of the disclosure may store approximate width values for each type of vehicle, and each vehicle 200 may be assumed to have the width value for its vehicle type.

As another geometric constraint example, vehicle heading may be estimated from its image. This provides an estimation of the orientation of the 3D bounding box, constraining its vertices to certain positions. The heading of vehicle 200 may be estimated in any suitable manner. As one example, vehicle 200 orientation classification may be carried out by one or more machine learning models, such as a CNN trained to receive input images of vehicles, and output likelihoods of a discrete set of orientations. Such CNNs may be trained on training data sets containing images of vehicles labeled with their orientations. Any set of orientations may be employed. In some embodiments of the disclosure, headings or orientations may be approximated as discrete values of orientations with respect to the ego vehicle reference frame, e.g., 8 discrete values, 0°, ±45°, ±90°, ±135°, 180°.

As a further geometric constraint example, the 3D box 220 may be at least initially assumed to have a geometric center that has a height, or z value, equal to the height of the origin point of the ego vehicle reference frame with respect to the global reference frame. That is, the z value of the 3D box 220 center may be initially set to the height of the origin point of the reference frame of the ego vehicle, or vehicle on which the camera capturing the image of vehicle 200 is located.

Additional geometric constraints on the 3D bounding box 220 coordinates may be imposed according to the 2D bounding box 210. For example, vertices of the 3D box 220 may be equated to corresponding edges of the 2D bounding box 210. More specifically, vertices of 3D box 220 are projected from their world coordinates to the image coordinates of the 2D bounding box 210, and constrained to fall along edges of the 2D box 210. Any vertices may be constrained to any appropriate edge of 2D bounding box 210. For example, in FIG. 2B, for an object oriented as shown, an upper left vertex 260 of 3D bounding box 220 (e.g., an upper passenger side corner of a front surface of box 220) may be constrained to lie at a point along the leftmost edge of 2D bounding box 210, an upper central vertex 250 of 3D bounding box 220 (e.g., an upper driver's side corner of a front surface of box 220) may be constrained to lie along the upper edge of 2D bounding box 210, and a lower right vertex 240 of 3D bounding box 220 (e.g., a lower driver's side corner of a back surface of box 220) may be constrained to lie along the rightmost edge of 2D bounding box 210. Other vertices may be selected as alternatives. For example, in some embodiments, lower central vertex 230 of 3D bounding box 220 (e.g., a lower driver's side corner of the front surface of box 220) may be selected to be constrained along the lower edge of 2D bounding box 210, although that is not the case in the example of FIG. 2B.

In some embodiments, determination of the 3D bounding box 220 coordinates may be accomplished by first estimating the coordinates (x, y, z) of the geometric center of the 3D box 220 in the image coordinate frame defining coordinates in the image, as well as its dimensions, i.e., length, width, and height (l, w, h). It may be observed that imposition of the above geometric constraints specifies values of z (e.g., height of origin point of ego vehicle reference frame) and w (e.g., estimated vehicle width), and results in 4 equations for the remaining 4 parameters (x, y, l, h), where each equation is of the form:

$$\begin{bmatrix} x \\ y \end{bmatrix} = KRT \begin{bmatrix} x_w \\ y_w \\ z_w \\ 1 \end{bmatrix}$$

where $x_w$, $y_w$, and $z_w$ are the coordinates of the 3D box center in the world or absolute coordinate frame, and K, R, and T are the intrinsic, rotation, and translation matrices of the camera, respectively. These 4 equations, constraints imposed, can be considered as an optimization problem, and accordingly solved using any suitable optimization process or method. As one example, a known trusted constraint region optimization scheme may be employed to iteratively determine a solution. The resulting 2D bounding box 210 center coordinates (x, y) and dimensions (l, h) in the image coordinate frame may then be used to determine the positions of the 3D bounding box 220 vertices in the image coordinate frame, allowing 3D bounding box 220 to be fully determined and drawn in the image, as shown in FIG. 2B. This process may be repeated for each object of interest in an input image.

It is noted that, while specific geometric constraints are enumerated above, embodiments of the disclosure contemplate use of any constraints that may allow for any sufficiently accurate determination of a 3D bounding box. In particular, the specific geometric constraints employed may be based on the classification of the object in question. For example, differing constraints may be applied for differently sized or shaped objects, e.g., rectangular objects, rounded objects, and the like.

Figure 3:
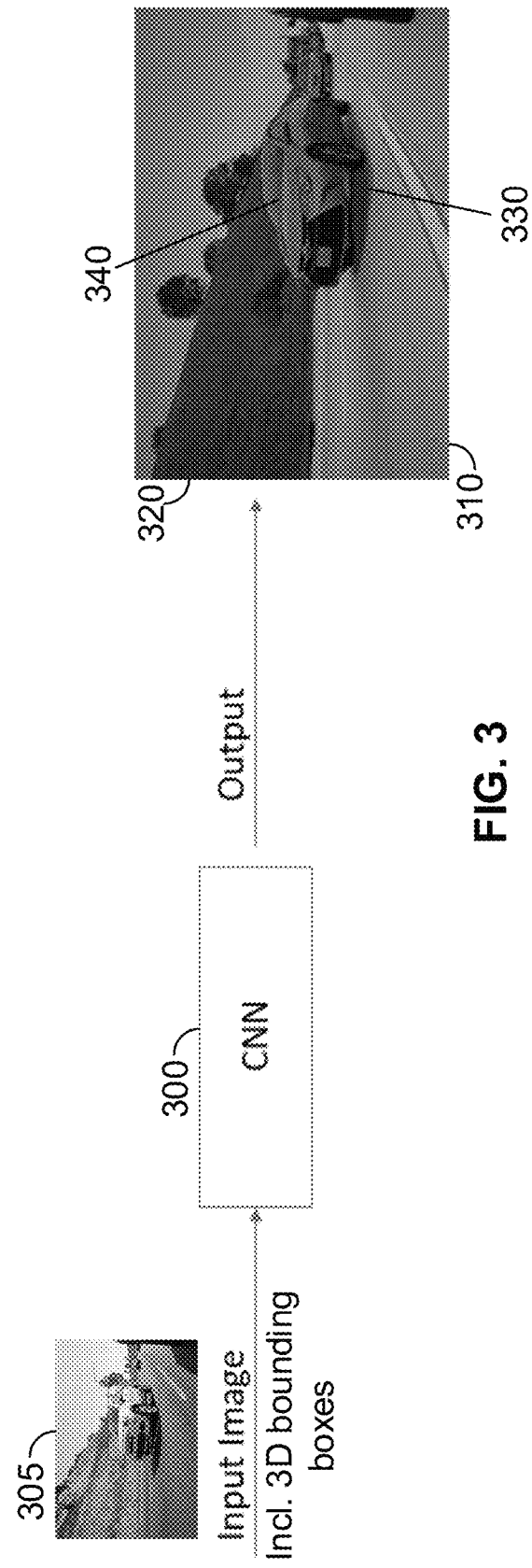
FIG. 3 is a block diagram illustration of exemplary machine learning models for determining drivable space in accordance with embodiments of the disclosure.

Once a 3D bounding box 220 is determined from its corresponding 2D bounding box 210, non-drivable space may be determined as the footprint of 3D bounding box 220. That is, when an object is identified as another vehicle, its footprint as determined by the 3D bounding box may be considered non-drivable space, allowing for accurate labeling of image portions as non-drivable space, and training of machine learning models to recognize this. FIG. 3 is a block diagram illustration of exemplary machine learning models for determining drivable space in accordance with embodiments of the disclosure. Here, a machine learning model such as a CNN 300 is trained to take in as inputs an image of nearby roadway, and to classify each pixel of the input image (each pixel representing a portion of an area outside of the vehicle) as being drivable space, non-drivable space, or disregarded and unclassified. More specifically, from an input image 305 of vehicle 340, CNN 300 outputs image 310 which can be the same image as input image 305 but with an area 330 under vehicle 340 (i.e., the footprint of vehicle 340) being classified as non-drivable space. Remaining portions of the road, which can be identified by known methods, may be classified as drivable space, while other non-road portions 320 (e.g., the sky and distant landscaping) may be disregarded and remain unclassified.

While FIGS. 2A-2B illustrate 2D and 3D bounding boxes calculated for vehicles, it is noted that embodiments of the disclosure may be employed to determine both 2D and 3D bounding boxes for any object, in particular any object that may be found on or near a road surface or within the potential path of a vehicle. For example, embodiments of the disclosure may be employed to determine both 2D and 3D bounding boxes for objects such as pedestrians, construction equipment, traffic cones, animals, oil spills, ice patches, debris, and any other items that may be present on a road and capable of identification.

Furthermore, such objects or items may be either stationary or moving. In particular, it may be observed that embodiments of the disclosure may determine both 2D and 3D bounding boxes for objects such as vehicles, both while they are stationary and while they are moving. Additionally, classification of road surfaces into drivable and non-drivable space may be performed for any objects, whether vehicle or otherwise, and whether moving or stationary. In particular, determination of drivable and non-drivable space may be performed in substantial real time for images captured from a stationary or moving reference frame such as a moving ego vehicle, allowing for determination of drivable space and autonomous navigation to be performed on the fly while such vehicles are being driven.

CNN 300 may be trained in any suitable manner, such as via processes further described below in connection with FIG. 6. In some embodiments of the disclosure, CNN 300 may be trained using images of roadways labeled with their corresponding drivable and non-drivable portions, which have been determined according to 3D bounding boxes surrounding objects on the roadways. In some embodiments of the disclosure, training set images may also be annotated with semantic information, where this semantic information may be any information that assists in identifying drivable and non-drivable space, such as pixelwise annotations of the class to which each pixel belongs. Thus, for example, each pixel of an image of a vehicle may be annotated or labeled as belonging to a vehicle class.

Figure 4:
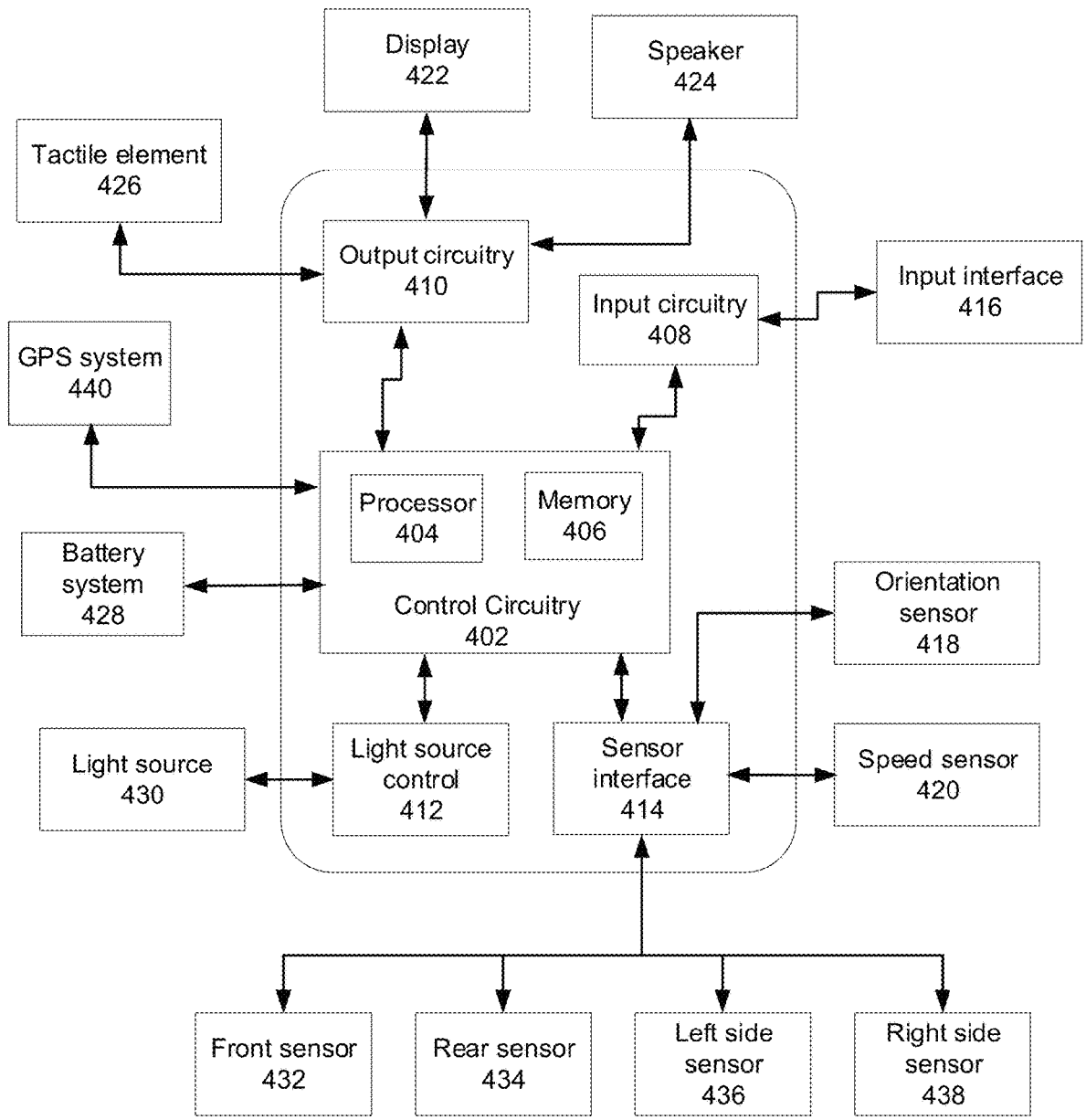
FIG. 4 shows a block diagram of components of a system of a vehicle for determining drivable space, in accordance with some embodiments of the present disclosure.

Methods of embodiments of the disclosure may be implemented in any system that allows sensors to capture sufficiently accurate images of surrounding objects such as vehicles. As one example, vehicles such as autonomous vehicles may have cameras built thereinto or thereon, to capture images of nearby vehicles. Processing circuitry of the ego vehicle, or remote processing circuitry, may then implement the above described machine learning models to recognize drivable and non-drivable space. 3D bounding boxes determined according to methods of embodiments of the disclosure may be employed to determine non-drivable spaces and thus generate training datasets for these machine learning models. Vehicles may thus determine drivable and non-drivable spaces of their surroundings, to assist in applications such as autonomous navigation. FIG. 4 shows a block diagram of components of a system of one such vehicle 400, in accordance with some embodiments of the present disclosure. Vehicle 400 may correspond to vehicle 100 of FIG. 1. Vehicle 400 may be a car (e.g., a coupe, a sedan, a truck, an SUV, a bus), a motorcycle, an aircraft (e.g., a drone), a watercraft (e.g., a boat), or any other type of vehicle.

Vehicle 400 may comprise control circuitry 402 which may comprise processor 404 and memory 406. Processor 404 may comprise a hardware processor, a software processor (e.g., a processor emulated using a virtual machine), or any combination thereof. In some embodiments, processor 404 and memory 406 in combination may be referred to as control circuitry 402 of vehicle 400. In some embodiments, processor 404 alone may be referred to as control circuitry 402 of vehicle 400. Memory 406 may comprise hardware elements for non-transitory storage of commands or instructions, that, when executed by processor 404, cause processor 404 to operate the vehicle 400 in accordance with embodiments described above and below. Control circuitry 402 may be communicatively connected to components of vehicle 400 via one or more wires, or via wireless connection.

Control circuitry 402 may be communicatively connected to input interface 416 (e.g., a steering wheel, a touch screen on display 424, buttons, knobs, a microphone or other audio capture device, etc.) via input circuitry 408. In some embodiments, a driver of vehicle 400 may be permitted to select certain settings in connection with the operation of vehicle 400 (e.g., color schemes of the urgency levels of FIG. 3, manners of presentation of the suggested steering indicator, when to provide the suggested steering indicator, etc.). In some embodiments, control circuitry 402 may be communicatively connected to GPS system 440 of vehicle 400, where the driver may interact with the GPS system via input interface 416. GPS system 440 may be in communication with multiple satellites to ascertain the driver's location and provide navigation directions to control circuitry 402.

Control circuitry 402 may be communicatively connected to display 422 and speaker 424 by way of output circuitry 410. Display 422 may be located at a dashboard of vehicle 400 (e.g., dashboard 204 and/or dashboard 208 of FIG. 2) and/or a heads-up display at a windshield (e.g., windshield 206 of FIG. 2) of vehicle 400. For example, the GUIs of FIG. 3 may be generated for display at display 422, and display 422 may comprise an LCD display, an OLED display, an LED display, or any other type of display. Speaker 424 may be located at any location within the cabin of vehicle 400, e.g., at the dashboard of vehicle 400, on an interior portion of the vehicle door. Display 422 and speaker 424 may provide visual and audio feedback, respectively, in connection with providing a suggested steering action indicator to a driver of vehicle 400 to turn vehicle 400 towards a side to avoid an obstacle or non-drivable space.

Control circuitry 402 may be communicatively connected to tactile element 426 via output circuitry 410. Tactile element 426 may be a mechanical device, e.g., comprising actuators configured to vibrate to cause a tactile or haptic sensation of the body of the driver. The tactile element may be located at one or more of a variety of locations in vehicle 400 (e.g., on driver's seat 212 of FIG. 2, a passenger seat, steering wheel 202 of FIG. 2, brake pedals, and/or gas pedals) to provide haptic feedback in connection with providing a suggested steering action indicator to a driver of vehicle 400 to turn vehicle 400 towards the side to avoid the first obstacle.

Control circuitry 402 may be communicatively connected (e.g., by way of sensor interface 414) to sensors (e.g., front sensor 432, rear sensor 434, left side sensor 436, right side sensor 438, orientation sensor 418, speed sensor 420). Orientation sensor 418 may be an inclinometer, an accelerometer, a tiltmeter, any other pitch sensor, or any combination thereof and may be configured to provide vehicle orientation values (e.g., vehicle's pitch and/or vehicle's roll) to control circuitry 402. Speed sensor 420 may be one of a speedometer, a GPS sensor, or the like, or any combination thereof, and may be configured to provide a reading of the vehicle's current speed to control circuitry 402.

In some embodiments, front sensor 432 may be positioned at a variety of locations of vehicle 400, and may be one or more of a variety of types, e.g., an image sensor, an infrared sensor, an ultrasonic sensor, a radar sensor, LED sensor, LIDAR sensor, etc., configured to capture an image or other position information of a nearby object such as a vehicle (e.g., by outputting a light or radio wave signal, and measuring a time for a return signal to be detected and/or an intensity of the returned signal, and/or performing image processing on images captured by the image sensor of the surrounding environment of vehicle 400).

Control circuitry 402 may be communicatively connected to battery system 428, which may be configured to provide power to one or more of the components of vehicle 400 during operation. In some embodiments, vehicle 400 may be an electric vehicle or a hybrid electric vehicle.

Control circuitry 402 may be communicatively connected to light source 430 via light source control 412. Light source 430 may be, e.g., a series of LEDs, and may be located at one or more of a variety of locations in vehicle 400 to provide visual feedback in connection with providing suggested steering action indicator to a driver of vehicle 400 to turn vehicle 400 towards a side to avoid the first obstacle.

It should be appreciated that FIG. 4 only shows some of the components of vehicle 400, and it will be understood that vehicle 400 also includes other elements commonly found in vehicles (e.g., electric vehicles), e.g., a motor, brakes, wheels, wheel controls, turn signals, windows, doors, etc.

Figure 5:
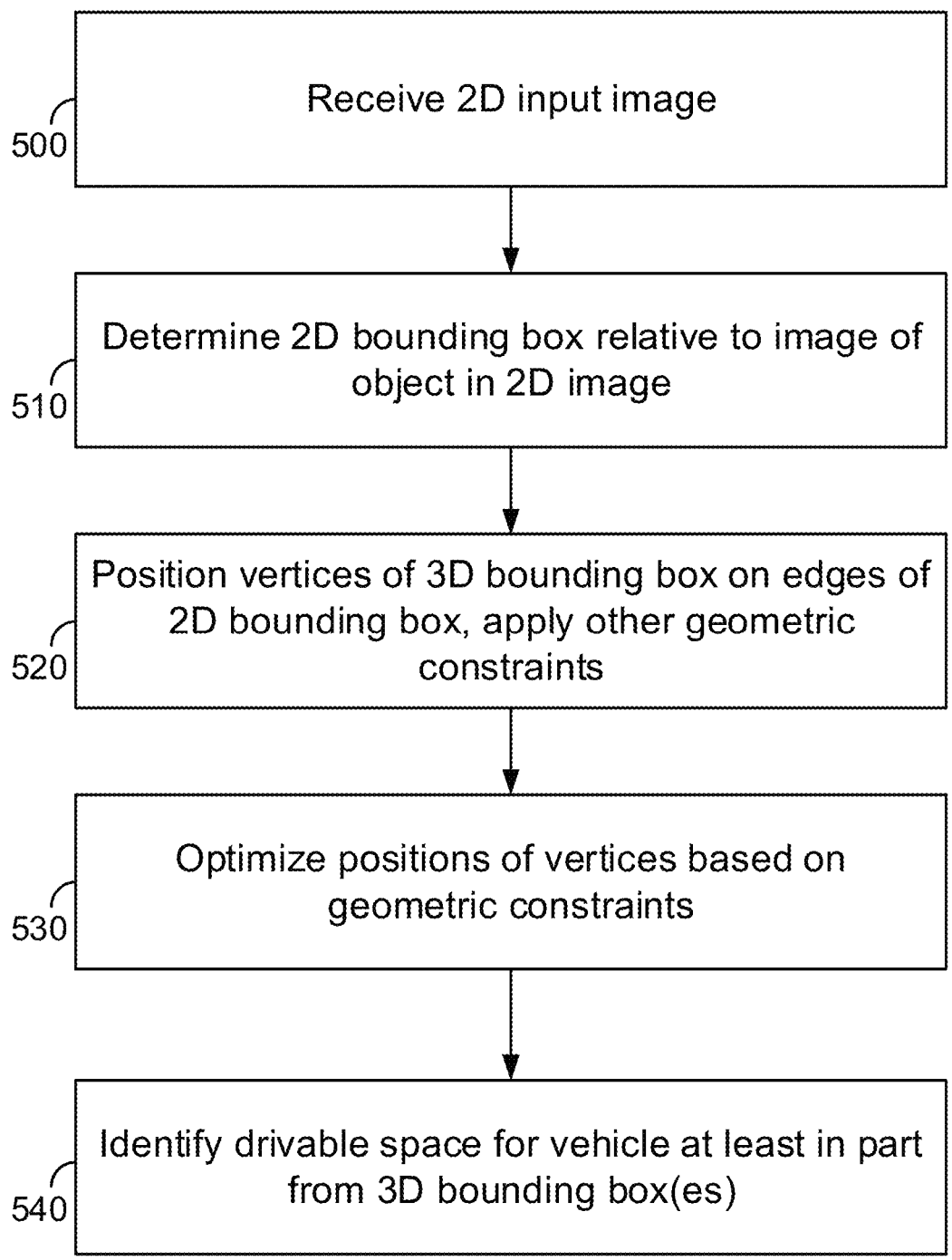
FIG. 5 is a flowchart illustrating exemplary methods for determination of drivable space, in accordance with embodiments of the disclosure.

FIG. 5 is a flowchart illustrating exemplary methods for determination of drivable space, in accordance with embodiments of the disclosure. Initially, a system such as control circuitry 402 of vehicle 400 may receive an image from, e.g., one of its sensors such as front sensor 432 (Step 500). As in FIG. 1, the image may be a 2D image that includes, for example, an image of a nearby vehicle 160. Control circuitry 402 may then identify or classify the vehicle, and determine a 2D bounding box relative to the image of this vehicle within the 2D image (Step 510).

Once a 2D bounding box is determined for the vehicle within the image, control circuitry 402 determines a 3D bounding box surrounding the identified vehicle, from the 2D bounding box. As above, various geometric constraints are applied to the positions of the 3D bounding box vertices, to render the equations describing the positions of the vertices solvable. For example, vertices of the 3D bounding box may be positioned along edges of the 2D bounding box, along with other geometric constraints (Step 520) such as estimation of the vehicle orientation, setting of the z and w values of the 3D bounding box initially equal to the height of the vehicle 400 reference frame and estimated width of the vehicle 400 type, respectively. Positions of the 3D bounding box vertices may then be solved for using any suitable optimization process or method (Step 530), such as by iteratively revising positions of vertices via, e.g., a known trusted constraint region optimization scheme.

Control circuitry 402 may then determine that portion of the received image which represents drivable space, in part by assuming that the 3D bounding boxes calculated in Steps 500-520 represent vehicles to be avoided, and labeling portions of the image accordingly (Step 540). Labeled images may be used to train a machine learning model such as a CNN, which vehicle 400 may execute to determine drivable and non-drivable portions of its surroundings and act accordingly, such as by planning paths through the determined drivable space.

Figure 6:
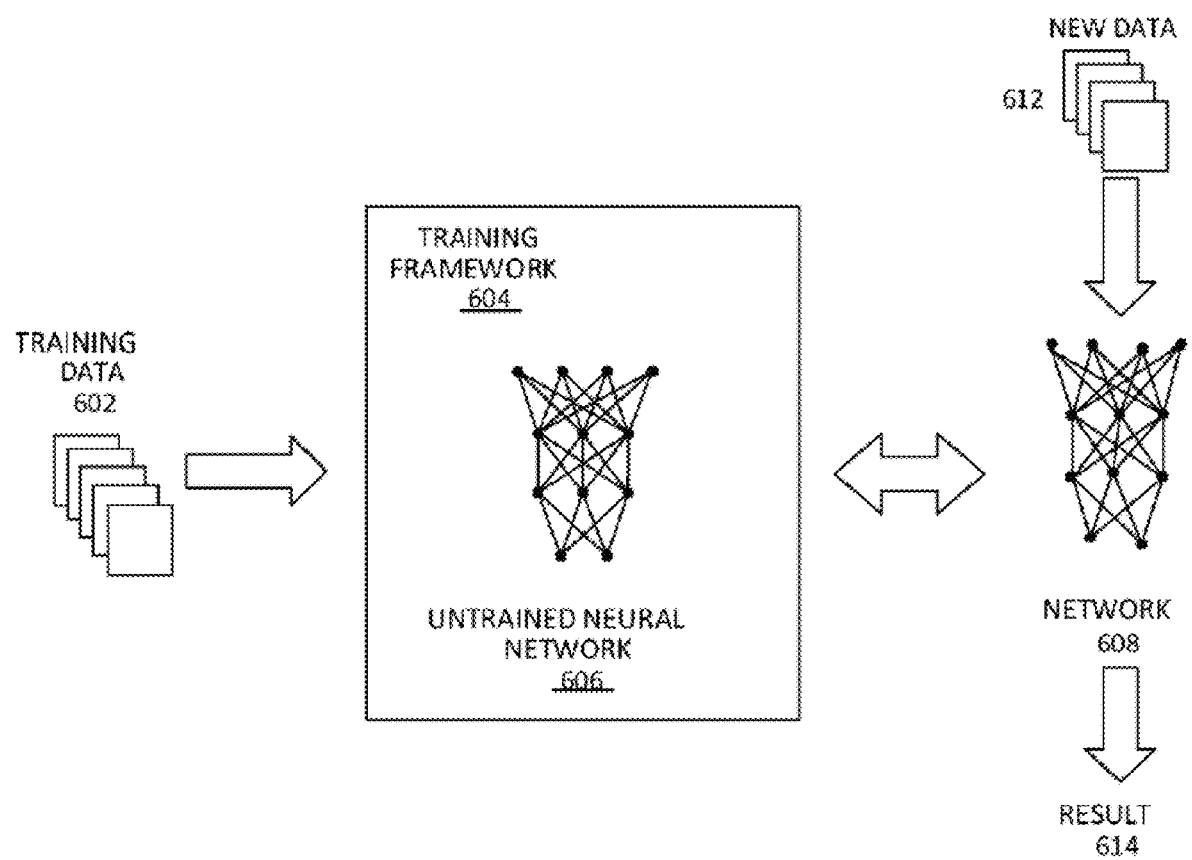
FIG. 6 conceptually illustrates training of machine learning models for determination of drivable space, in accordance with embodiments of the disclosure.

FIG. 6 conceptually illustrates training of machine learning models for determination of drivable space, in accordance with embodiments of the disclosure. In some embodiments, the machine learning model may include a neural network such as a CNN. An untrained neural network 606 is trained using a training dataset 602 which, in some embodiments of the disclosure, may be a set of images of vehicles. In some embodiments, training framework 604 is a PyTorch framework, whereas in other embodiments, training framework 604 is a TensorFlow, Boost, Caffe, Microsoft Cognitive Toolkit/CNTK, MXNet, Chainer, Keras, Deeplearning4j, or other training framework. Training framework 604 trains the untrained neural network 606 using processing resources described herein, to generate a trained neural network 608. In some embodiments, initial weights may be chosen randomly or by pre-training using a deep belief network. Training may be performed in either a supervised, partially supervised, or unsupervised manner.

In some embodiments, such as when a regression classifier is used, untrained neural network 606 may be trained using supervised learning, wherein training dataset 602 includes an input paired with a desired output, or where training dataset 602 includes input having known output and outputs of neural networks are manually graded. In some embodiments, untrained neural network 606 is trained in a supervised manner. Training framework 604 processes inputs from training dataset 602 and compares resulting outputs against a set of expected or desired outputs. In some embodiments, errors are then propagated back through untrained neural network 606. Training framework 604 adjusts weights that control untrained neural network 606. Training framework 604 may include tools to monitor how well untrained neural network 606 is converging towards a model, such as trained neural network 608, suitable to generating correct answers, such as in result 614, based on known input data, such as new data 612. In some embodiments, training framework 604 trains untrained neural network 606 repeatedly while adjusting weights to refine an output of untrained neural network 606 using a loss function and adjustment process, such as stochastic gradient descent. In some embodiments, training framework 604 trains untrained neural network 606 until untrained neural network 606 achieves a desired accuracy. Trained neural network 608 can then be deployed to implement any number of machine learning operations.

In some embodiments, untrained neural network 606 may be trained using unsupervised learning, wherein untrained neural network 606 attempts to train itself using unlabeled data. In some embodiments, unsupervised learning training dataset 602 may include input data without any associated output data or "ground truth" data. Untrained neural network 606 can learn groupings within training dataset 602 and can determine how individual inputs are related to untrained dataset 602. In some embodiments, unsupervised training can be used to generate a self-organizing map, which is a type of trained neural network 608 capable of performing operations useful in reducing dimensionality of new data 612. Unsupervised training can also be used to perform anomaly detection, which allows identification of data points in a new dataset 612 that deviate from normal or existing patterns of new dataset 612.

In some embodiments, semi-supervised learning may be used, which is a technique in which training dataset 602 includes a mix of labeled and unlabeled data. Training framework 604 may thus be used to perform incremental learning, such as through transferred learning techniques. Such incremental learning enables trained neural network 608 to adapt to new data 612 without forgetting knowledge instilled within the network during initial training.

In some instances, sensors such as sensor 432 may capture only a portion of an object. For example, with reference to FIG. 1, when only a front portion of vehicle 150 is within field of view 120, the resulting image is a truncated image of only this front portion, the remainder of the vehicle 150 having been "cut off" and failing to appear. In such a case, 2D bounding box would thus only surround the front portion of the vehicle 150, leading to a corresponding 3D bounding box with the same deficiency, potentially resulting in an incomplete picture of the non-drivable space presented by vehicle 150. This in turn may result in inaccurate path planning.

Figure 7:
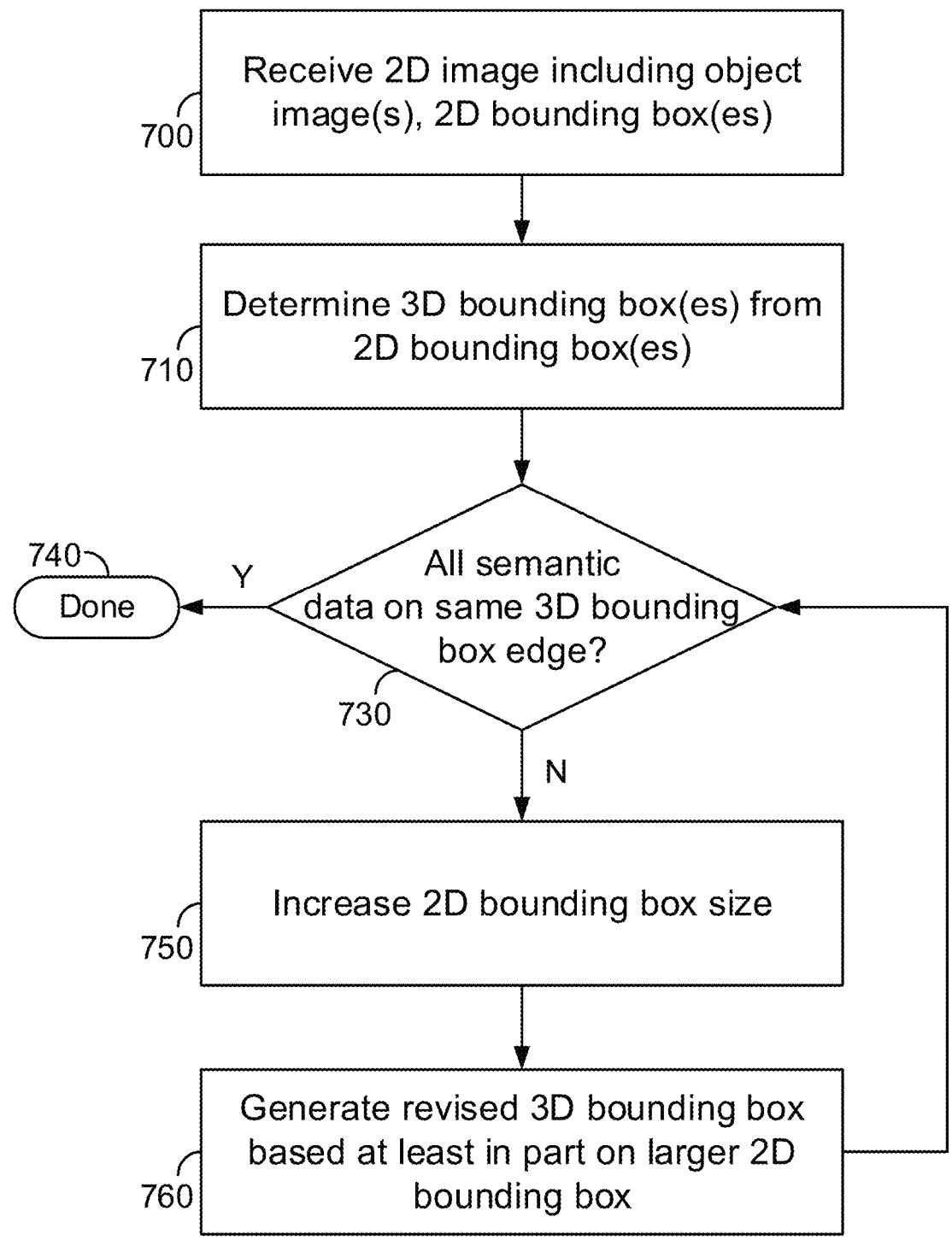
FIG. 7 is a flowchart illustrating exemplary methods of generating 3D bounding boxes for truncated objects, in accordance with embodiments of the disclosure.

FIG. 7 is a flowchart illustrating exemplary methods of generating 3D bounding boxes for truncated objects, in accordance with embodiments of the disclosure. Initially, control circuitry 402 may receive a 2D image that includes various objects, some of which may be truncated and only partially captured. These objects may be identified, and 2D bounding boxes calculated for them as above (Step 700). 3D bounding boxes may then be calculated for each of these 2D bounding boxes, also as above (Step 710). It may be observed that 3D bounding boxes as initially calculated for truncated objects will likely surround only those portions of the truncated objects that actually appear in the input image. Accordingly, control circuitry 402 may successively increase the size of the 2D bounding box, recalculating a 3D bounding box for each new 2D bounding box. This process is continued until a recalculated 3D bounding box is of sufficient volume to enclose the true extent of the truncated vehicle, as determined by, e.g., semantic annotations.

In some embodiments of the disclosure, a check is made to determine whether all semantic data of the identified vehicle are on the same side of one edge of the 3D bounding box (Step 720). More specifically, in some embodiments of the disclosure, the check is made to determine whether all semantic points of the vehicle are above the lower right edge of the 3D bounding box, e.g., the near edge that faces the road. This effectively indicates whether the 3D bounding box encloses the entire vehicle or not. Vehicle semantic points may be determined by, e.g., annotating pixels of input images as belonging to a vehicle class.

If all semantic points lie above the lower right edge of the 3D bounding box, the calculated 3D bounding box is deemed to substantially encompass or surround the entire vehicle, and the process is complete (Step 740). If not, then the 3D bounding box is deemed to not yet encompass the entire vehicle, and the 2D bounding box is revised to increase its size (Step 750), such as by extending it further beyond the edge of the image that truncates the vehicle. A corresponding 3D bounding box is then calculated as above (Step 760), and the process returns to Step 730 to determine whether the revised 3D bounding box now substantially encompasses the entire vehicle.

Figure 8A:
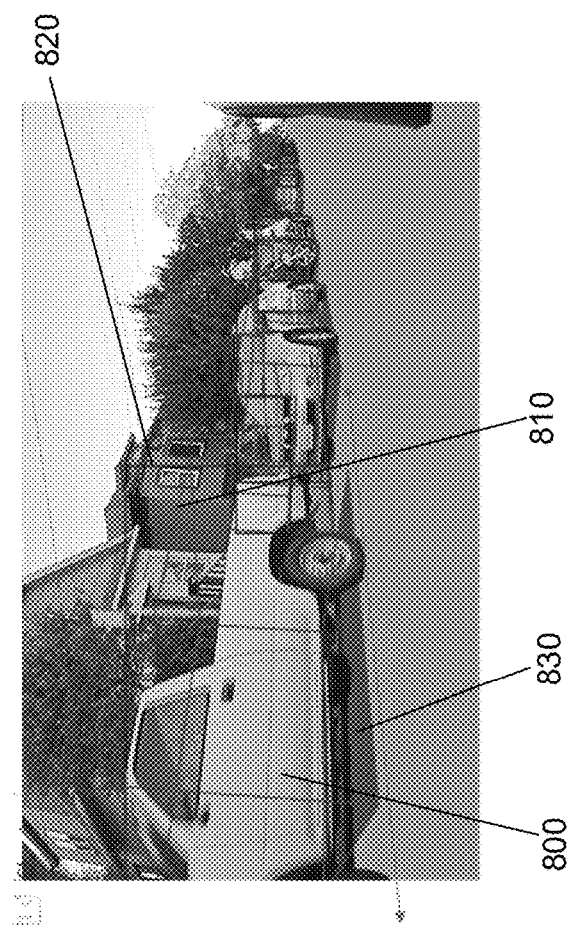
FIGS. 8A and 8B graphically illustrate generation of 3D bounding boxes and corresponding non-drivable space for truncated objects, in accordance with embodiments of the disclosure.
Figure 8B:
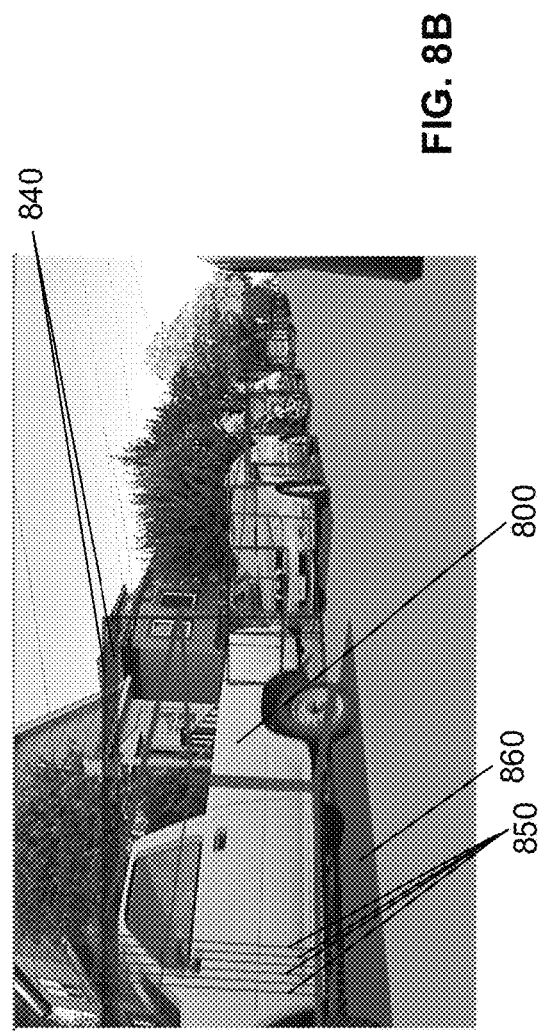

FIGS. 8A and 8B graphically illustrate generation of 3D bounding boxes and corresponding non-drivable space for truncated objects, in accordance with embodiments of the disclosure. As can be seen, vehicle 800 is truncated in the images of FIGS. 8A and 8B. A 2D bounding box 820 calculated for vehicle 800 only encompasses the portion of the vehicle 800 that appears in the image, leaving out the remainder of the vehicle 800. The resulting 3D bounding box 810, and thus the calculated non-drivable space 830, shown as the rectangular patch under the vehicle, is thus too small and fails to span the entire vehicle 800. Inaccurate navigation may result. Accordingly, the 2D bounding box 840 may be successively revised to increase its size as shown in FIG. 8B, until all semantic points of the vehicle, or all pixels annotated as belonging to a vehicle class, are positioned to the same side of the lower right edge of the corresponding 3D bounding box 850. The resulting non-drivable space 860 now spans the entire visible portion of the vehicle 800, as shown.

Figure 9A:
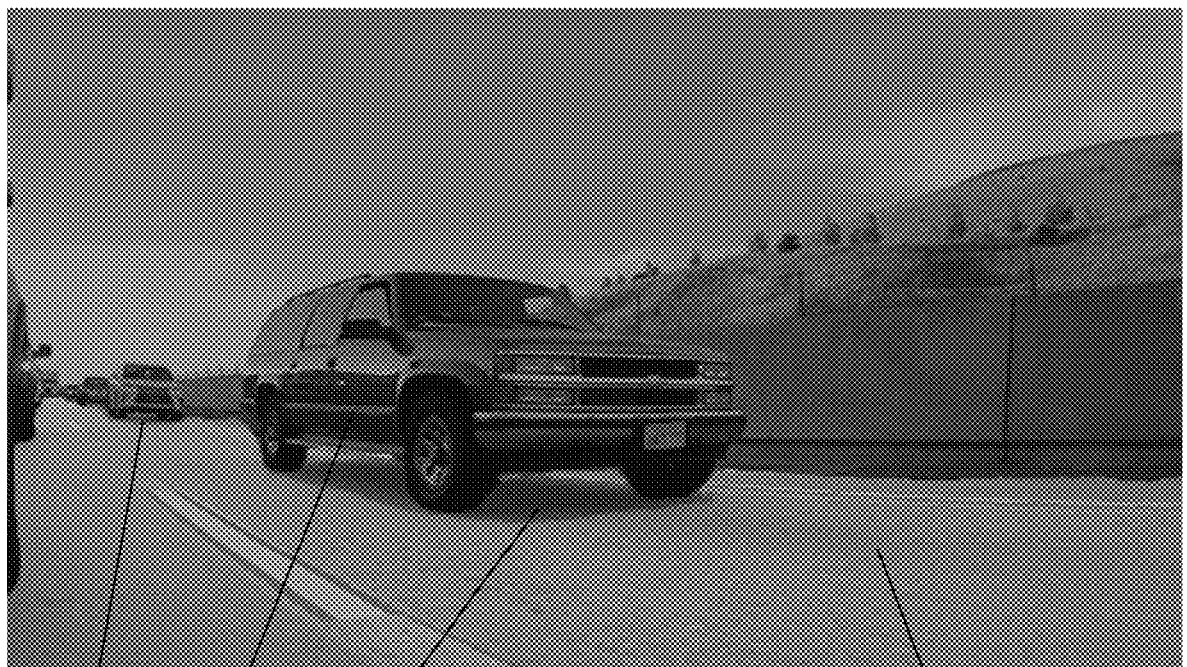
FIGS. 9A and 9B graphically illustrate drivable and non-drivable spaces, determined in accordance with embodiments of the disclosure.
Figure 9B:

FIGS. 9A and 9B graphically illustrate drivable and non-drivable spaces, determined in accordance with embodiments of the disclosure. FIGS. 9A and 9B are roadway images of vehicles 920, with their corresponding drivable 910 and non-drivable 900 spaces classified by a trained machine learning model as described herein. The calculated non-drivable spaces 910 appear as patches underneath each vehicle 920, and substantially span the entire footprint of each vehicle, allowing for accurate navigation and path determination. Remaining road surfaces which are substantially free of any objects or other obstructions may be classified as drivable space 900.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, any machine learning models may be employed in 2D bounding box generation, 3D bounding box generation, or drivable space determination. 3D bounding box vertices may be determined in any manner, using any set of geometric constraints. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of determining drivable space using a two-dimensional image comprising an image of an object, the method comprising:
   determining a two-dimensional bounding box relative to the image of the object within the two-dimensional image;
   using processing circuitry, generating a three-dimensional bounding box at least partially surrounding the image of the object, by:
      positioning vertices of the three-dimensional bounding box on edges of the two-dimensional bounding box, and
      optimizing positions of the vertices based on a set of geometric constraints that reduce a number of parameters needed to determine the three-dimensional bounding box; and
   identifying the drivable space for a vehicle at least in part from the three-dimensional bounding box.

2. The method of claim 1, further comprising determining an orientation of the object in the two-dimensional image, wherein the generating the three-dimensional bounding box is based at least in part on the orientation of the object.

3. The method of claim 1, further comprising determining a characteristic dimension of the object in the two-dimensional image, wherein the generating the three-dimensional bounding box is based at least in part on the characteristic dimension of the object.

4. The method of claim 3, further comprising identifying the object as an identified object, and receiving a dimension associated with the identified object, the characteristic dimension of the object comprising the received dimension.

5. The method of claim 4, wherein the characteristic dimension of the object comprises a width of the identified object.

6. The method of claim 1, wherein the optimizing comprises iteratively revising positions of the vertices.

7. The method of claim 1, further comprising determining semantic points of the object, wherein the generating the three-dimensional bounding box further comprises:
   (a) increasing a size of the two-dimensional bounding box, so as to form a larger two-dimensional bounding box;
   (b) generating a revised three-dimensional bounding box based at least in part on the larger two-dimensional bounding box; and
   (c) repeating (a) and (b) until the revised three-dimensional bounding box encompasses the semantic points of the object.

8. The method of claim 1, wherein the identifying the drivable space comprises identifying the drivable space using one or more trained machine learning models taking as inputs the image of the object and the three-dimensional bounding box, and providing an output indicative of the drivable space for the vehicle.

9. The method of claim 1, wherein the identifying the drivable space further comprises training one or more machine learning models using the image of the object and the three-dimensional bounding box, the one or more machine learning models taking as inputs the image of the object and the three-dimensional bounding box, and providing an output indicative of the drivable space for the vehicle.

10. A method of generating a training dataset for one or more machine learning models configured to provide an output indicative of drivable space for a vehicle based on two-dimensional images comprising images of objects and on semantic information of the objects, the method comprising:
   generating three-dimensional bounding boxes at least partially surrounding the objects in the two-dimensional images by optimizing positions of vertices of the three-dimensional bounding boxes based on a set of geometric constraints that reduce a number of parameters needed to determine the three-dimensional bounding boxes;
   using processing circuitry, determining, based at least in part on the three-dimensional bounding boxes and based at least in part on the semantic information, labels corresponding to drivable space surrounding the images of the objects in the two-dimensional images, so as to form labeled ones of the two-dimensional images; and
   adding the labeled ones of the two-dimensional images to the training dataset.

11. The method of claim 10, wherein the generating three-dimensional bounding boxes further comprises determining two-dimensional bounding boxes at least partially surrounding the objects in the two-dimensional images, and generating the three-dimensional bounding boxes based at least in part on positioning the vertices of the three-dimensional bounding boxes on edges of the respective two-dimensional bounding boxes.

12. The method of claim 10, wherein the optimizing positions of vertices of the three-dimensional bounding boxes comprises iteratively revising positions of the vertices.

13. The method of claim 11, further comprising determining orientation of the objects in the two-dimensional images, wherein the generating the three-dimensional bounding boxes is based at least in part on the respective two-dimensional bounding boxes and on the respective orientations of the objects.

14. The method of claim 11, further comprising receiving characteristic dimensions of the objects in the two-dimensional images, wherein the generating the three-dimensional bounding boxes is based at least in part on the respective two-dimensional bounding boxes and on the respective characteristic dimensions of the objects.

15. The method of claim 14, further comprising identifying the objects as identified objects, and receiving dimensions associated with the identified objects, the characteristic dimensions of the objects comprising the received dimensions.

16. The method of claim 11, further comprising determining semantic points of the images of the objects, and wherein the generating the three-dimensional bounding boxes further comprises:
   (a) increasing sizes of the two-dimensional bounding boxes, so as to form larger two-dimensional bounding boxes;
   (b) generating revised three-dimensional bounding boxes based at least in part on the larger two-dimensional bounding boxes; and
   (c) repeating (a) and (b) until the revised three-dimensional bounding boxes encompass the semantic points of the corresponding images of the objects.

17. The method of claim 10, wherein the one or more machine learning models take as inputs the two-dimensional images and the three-dimensional bounding boxes, and provide an output indicative of the drivable space for the vehicle.

18. A system for determining drivable space using a two-dimensional image comprising an image of an object, the system comprising:
   a storage device; and
   processing circuitry configured to:
      determine a two-dimensional bounding box relative to the image of the object within the two-dimensional image;
      generate a three-dimensional bounding box at least partially surrounding the image of the object, by:
         positioning vertices of the three-dimensional bounding box on edges of the two-dimensional bounding box, and
         optimizing positions of the vertices based on a set of geometric constraints that reduce a number of parameters needed to determine the three-dimensional bounding box; and
      identify the drivable space for a vehicle at least in part from the three-dimensional bounding box.

19. The system of claim 18, wherein the identifying the drivable space further comprises identifying the drivable space using one or more machine learning models having as inputs the image of the object and the three-dimensional bounding box, and having an output corresponding to the drivable space for the vehicle.

* * * * *